United States Patent [19]

VanCise, Jr.

[11] Patent Number: 4,531,603
[45] Date of Patent: Jul. 30, 1985

[54] RACK AND PINION STEERING GEAR WITH ADJUSTABLE LOW FRICTION ANTI-ROLL RACK BEARING

[75] Inventor: Kenneth L. VanCise, Jr., Bay City, Mich.

[73] Assignee: General Motors Corporation, Detroit, Mich.

[21] Appl. No.: 569,184

[22] Filed: Jan. 9, 1984

[51] Int. Cl.³ ............................................. B62D 5/06
[52] U.S. Cl. .................................... 180/148; 280/96; 74/422; 74/498
[58] Field of Search .................... 180/148; 280/96; 74/89.17, 89.19, 422, 498

[56] References Cited

U.S. PATENT DOCUMENTS

| 3,157,061 | 11/1964 | Parker | 74/498 |
| 3,897,845 | 8/1975 | Von Löwis ot Monar | 74/498 X |
| 4,271,716 | 6/1981 | Carduner | 74/422 |
| 4,322,986 | 4/1982 | Adams | 74/498 X |

FOREIGN PATENT DOCUMENTS 0122256 7/1983 Japan .................................. 180/148

Primary Examiner—Harold W. Weakley
Attorney, Agent, or Firm—Charles R. White

[57] ABSTRACT

Rack and pinion steering gear in which an adjustable preloaded rack bearing carries an endless train of balls which are fed into and out of a linear track in the rack. With this ball train interconnection, the sliding friction between the rack and rack bearing is reduced while rack rotation from torque loads is prevented.

3 Claims, 5 Drawing Figures

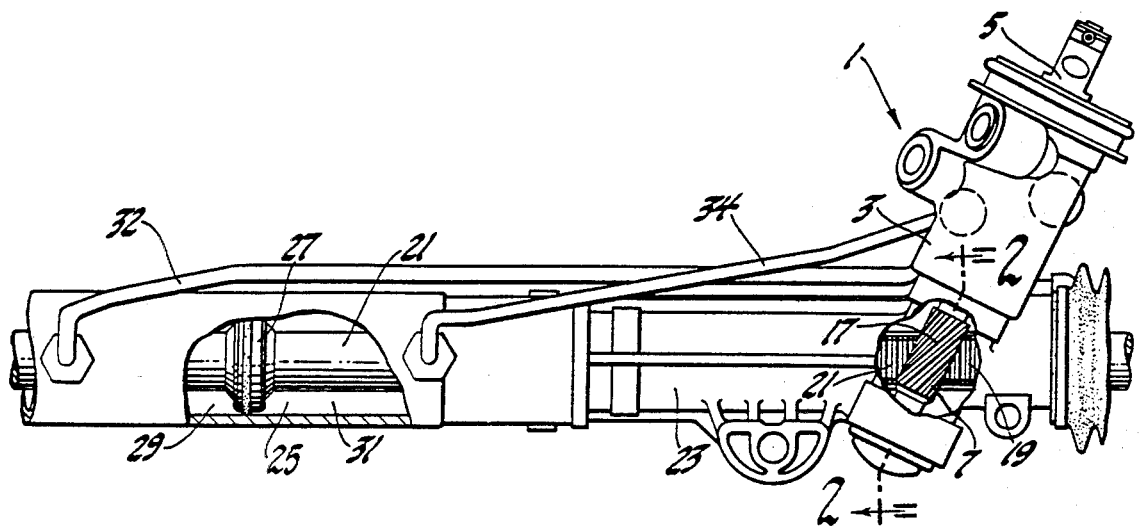

RACK AND PINION STEERING GEAR WITH ADJUSTABLE LOW FRICTION ANTI-ROLL RACK BEARING

This invention relates to vehicle steering and more particularly to a rack and pinion steering gear with a new and improved rack bearing assembly which provides low friction support of the rack, eliminates rack roll and allows adjustment between the meshing teeth of the rack and pinion for adjustment of input or steering torque.

Prior to the present invention, the cylindrical racks of rack and pinion steering gears having experienced high torque loads during steering operation which tends to turn the rack about its central axis. This turning movement while limited by the constraints of the meshing gear teeth has resulted in undesirable tooth wear, operating roughness and noise generation. To correct this, some rack and pinion steering gears have special bearing bushes with flattened sides to engage a flat on the rack to prevent rack roll. While such prior constructions have provided improved anti-roll benefits, they did not reduce sliding friction between the rack and the adjustable rack bearing preloaded to provide a selected turning torque for steering gear input. Another prior rack and pinion arrangement utilized an endless ball train between the rack bearing and the rack to reduce sliding friction. While providing benefits in this regard, this latter enhanced rack roll and tooth wear.

The present invention is applicable to manual and power assisted rack and pinion gears and provides for the improved engagement of the rack and the opinion gearing with an advanced anti-roll rack bearing assembly which is spring-biased into engagement with a rack. This bearing assembly forces the rack teeth into minimized lash engagement with the teeth of the associated pinion. The rack bearing assembly importantly incorporates an endless train of balls which run in a linear track formed in the rack to thereby couple the rack with the rack bearing to prevent the roll of the rack from pinion gear thrust or other torque loads exerted on the rack. The endless ball train construction and its interconnection between the rack and bearing further provides an anti-friction support of the rack on the rack bearing for low friction sliding motion in response to the input through the pinion gear. While providing reduced friction and anti-roll features, the rack bearing assembly can be load adjusted by a threaded plug and a cooperating adjustor spring to provide a spring force which sets input or pinion torque while compensating for wear between the gearing teeth and reducing lash therebetween.

It is a feature, object and advantage of this invention to provide a new and improved rack and pinion steering gear in which the rack is preloaded to the pinion with an adjuster plug assembly that incorporates an endless ball train that provides reduced sliding friction between the rack bearing and rack and which positively prevents roll of the rack from pinion thrust or other roll inducing forces acting on the rack.

Another feature, object and advantage of this invention is to provide a new and improved rack and pinion steering gear with a preloaded and adjustable rack and pinion bearing assembly which features an endless ball train that circulates a linear track in the rack to prevent rack rotation and to provide optimized low friction between the rack bearing and rack thereby facilitating steering gear operation.

These and other features, objects and advantages of this invention will be more apparent from the following detailed description and drawing in which:

FIG. 1 is a front view of a portion of a rack and pinion steering gear with parts broken away.

FIG. 2 is a sectional view taken along lines 2—2 of FIG. 1 with some parts being shown in full lines.

FIG. 3 is a sectional view taken along lines 3—3 of FIG. 2.

FIG. 4 is a sectional view taken generally along lines 4—4 of FIG. 2.

FIG. 5 is a sectional view taken along lines 5—5 of FIG. 4 with some parts removed.

Turning now in greater detail to the drawings, there is shown in FIG. 1 a rack and pinion steering gear 1 having a main housing 3 in which a manually rotatable input or stub shaft 5 and a rotary power steering gear valve are operatively mounted. The stub shaft and valve corresponds in construction and operation to that of the Spann patent application Ser. No. 375,715 filed May 7, 1982 for Power Steering Gear and Open Center Rotary Valve Therefor assigned to the assignee of this invention and hereby incorporated by reference. The stub shaft extends through the housing 3 and carries a pinion gear 7 adjacent to the lower end thereof which is mounted in the housing 3 by a ball bearing unit 9 and retained therein by a nut 11 threaded onto the end thereof. A removable cup-like cover 13 of sheet metal is friction-fitted into the annular open end 15 of the housing to seal this portion of the housing. The pinion gear 7 has helical gear teeth 17 which are adapted to engage the helical teeth 19 formed in the adjacent face of a rack 21. The opposite ends of the rack are operatively connected to the dirigible wheels of the vehicle by conventional tie rods not shown. The rack is an elongated and generally cylindrical member which is mounted for linear sliding movement in the laterally extending portion 23 of the housing 3 and in a power cylinder 25 attached to the inboard end of the laterally extending portion of the housing. A piston 27 connected to the rack separates the power cylinder into separate hydraulic pressure chambers 29, 31. These chambers are hydraulically connected to housing 3 and the rotary valve therein by lines 32, 34. These chambers are hydraulically pressurized or opened to exhaust by operation of the valve as explained in the above-referenced application to Spann so that translation of the track 21 in response to manual actuation of the stub shaft 5 by the vehicle operator is hydraulically power assisted.

As shown best in FIG. 2, the teeth 19 of the rack are urged into close meshing engagement with the teeth 17 of the pinion by a spring-biasedd rack bearing assembly 35 which has a generally cylindrical body 37 that slidably fits within a cylindrical projecting housing 39 of main housing 3. The rack bearing body has semicylindrical bearing surface 40 which has limited engagement with the corresponding surface of rack 21. The rack bearing assembly 35 includes an endless ball train 41 that runs in an elliptical track 44 which extends longitudinally in rack bearing body 37. When the rack is linearly moved by pinion rotation, spherical steel balls 48 of the ball train 41 enter into a linear track 51 formed into the rack to prevent the rack from turning on its own central axis 53 from thrust loads from pinion 7 or from other external forces. The opposite ends of the ball bearing assembly have deflector plates 55, 57 secured to the rack bearing body 37 which are generally arcuate in formation to guide the balls into the linear track 51 of the rack and from track back 51 to the lower return path 52 in the rack bearing body 37.

In addition to preventing the rotation of the rack, the balls of the train support the rack for low-friction sliding movement in the housing relative to the rack bearing. Accordingly, when the vehicle operator manually turns the steering wheel, the pinion gear is turned and the rack will be linearly moved with low friction in the housing for turning the dirigible wheels of the vehicle with low-friction between the rack bearing and rack.

The rack bearing assembly 35 is movably mounted in its housing 39 by advancing or retracting an adjuster plug 61 threadedly mounted therein. A hex head 63 is provided on the outer end of the adjuster plug to facilitate the adjustment thereof by a convention wrench. A helical adjustor spring 65 is operatively interposed between the outer end of the rack bearing 37 and a pocket 66 in the inner end of the adjuster plug 61 to provide a spring force urging the teeth of the rack and pinion gears into minimized lash engagement and for setting the torque required to manually turn the pinion gear 7 for vehicle steering purposes. After the adjuster plug has been removed to its selected adjusted portion, an adjuster plug lock nut 67 threaded on the adjuster plug is advanced into contact with the end of the housing 59 to keep the plug in position.

This invention sharply reduces the high friction which normally occurs between the rack and bushing of manual rack and pinion gears. In such gears there are high steering torque loads on the pinion since there is no power assist. Such steering torque results in a high separation force between the pinion and consequently high friction between the rack and rack bearing. However, with the endless ball train of this invention employed as disclosed, a manual rack and pinion steering gear can be operated with reduced steering effort since the friction between the rack and rack bearing is effectively reduced.

Instead of utilizing a single ball train as shown, two ball tracks spaced 45 degrees to either side of the center line of the rack bearing 37 can, with additional cost, be employed to provide the anti-rotational and anti-friction feature of the preferred embodiment.

While a preferred embodiment of this invention has been shown and described of the illustrative invention, other embodiments will be more apparent to those skilled in the art. Accordingly, the scope of this invention is set forth in the following claims.

The embodiments of the invention in which an exclusive property or privilege is claimed are defined as follows:

1. A rack and pinion steering gear for steering the dirigible wheels of a vehicle comprising a rotatable pinion gear adapted to be rotated by a steering wheel of a vehicle, said pinion gear having a plurality of gear teeth forming the outer periphery thereof, an elongated rack having a series of gear teeth thereon in meshing engagement with the teeth of said pinion gear, said rack being longitudinally movable in response to rotation of said pinion gear, a stationary housing for said longitudinally movable rack and for said rotatable pinion gear, a bearing in said housing for slidably supporting said rack therein, a recirculating train of balls operatively interposed between said rack and said bearing to reduce sliding friction therebetween while inhibiting roll of said rack relative in said housing in response to torque loads urging said rack to rotate.

2. A rack and pinion steering gear for steering the dirigible wheels of a vehicle comprising a rotatable pinion gear adapted to be rotated by a steering wheel of a vehicle, said pinion gear having a plurality of gear teeth forming the outer periphery thereof, an elongated rack having a series of gear teeth thereon in meshing engagement with the teeth of said pinion gear, said rack longitudinally movable in response to rotation of said pinion gear, a stationary housing for said longitudinally movable rack and said pinion gear, a rack bearing assembly operatively mounted in said housing supporting said rack for linear sliding movement in said housing, said rack bearing assembly having an endless train of spherical members movable in an endless track provided in said bearing and a linear groove in said rack to reduce sliding friction therebetween while eliminating roll of said rack relative to said housing in response to torque loads applied to said rack.

3. A rack and pinion steering gear for steering the dirigible wheels of a vehicle comprising a pinion gear adapted to be rotated by a steering wheel of a vehicle, said pinion gear having a plurality of helical gear teeth forming the outer periphery thereof, an elongated rack having a series of helical gear teeth thereon in meshing engagement with the teeth of said pinion gear, a housing for said rack and said pinion gear, said rack being longitudinally movable in said housing in response to rotation of said pinion gear, a rack bearing assembly operatively mounted in said housing for supporting said rack for longitudinal sliding movement in said housing, said rack having a longitudinal groove therein, a recirculating train of steel balls operatively mounted in said rack bearing assembly and circulating through an endless track formed by said groove and said bearing assembly to reduce sliding friction therebetween while eliminating roll of said rack relative to said housing in response to a torque urging rotation of said rack.

* * * * *